March 10, 1936.  M. ROMAINE ET AL  2,033,450
PLANETARY MILLING MACHINE
Filed Oct. 26, 1933  5 Sheets-Sheet 1

Inventors
MILLARD ROMAINE
ERWIN G. ROEHM
By H. K. Parsons
Attorney

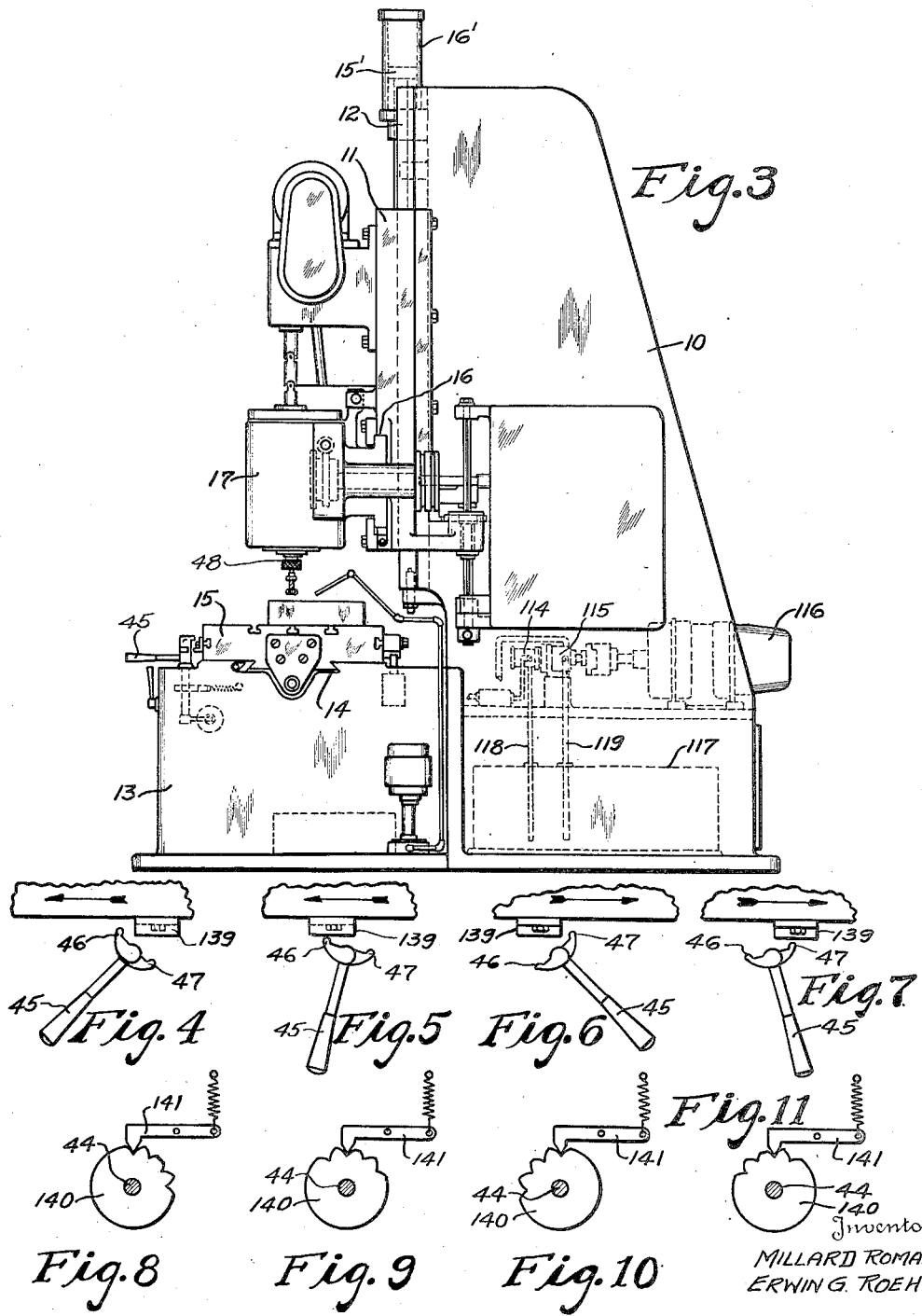

March 10, 1936.  M. ROMAINE ET AL  2,033,450

PLANETARY MILLING MACHINE

Filed Oct. 26, 1933  5 Sheets-Sheet 3

Inventors
MILLARD ROMAINE
ERWIN G. ROEHM

By  A.H.Parsons
Attorney

March 10, 1936.  M. ROMAINE ET AL  2,033,450
PLANETARY MILLING MACHINE
Filed Oct. 26, 1933  5 Sheets-Sheet 4
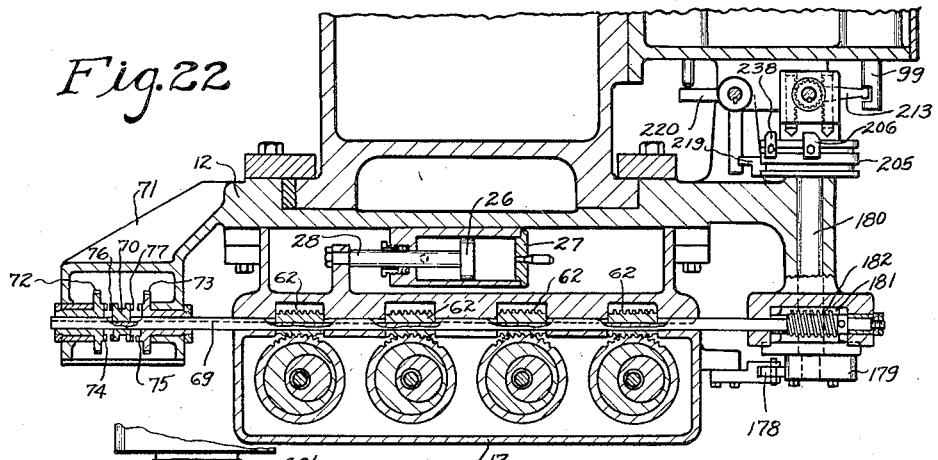
Fig. 22
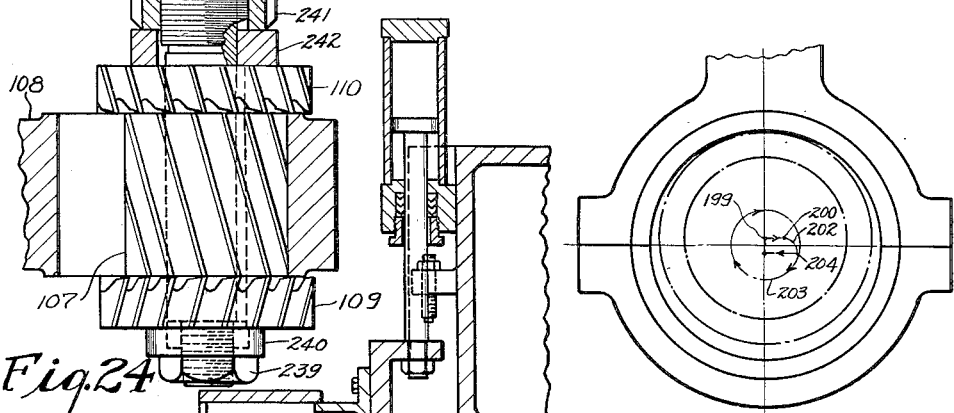
Fig. 24
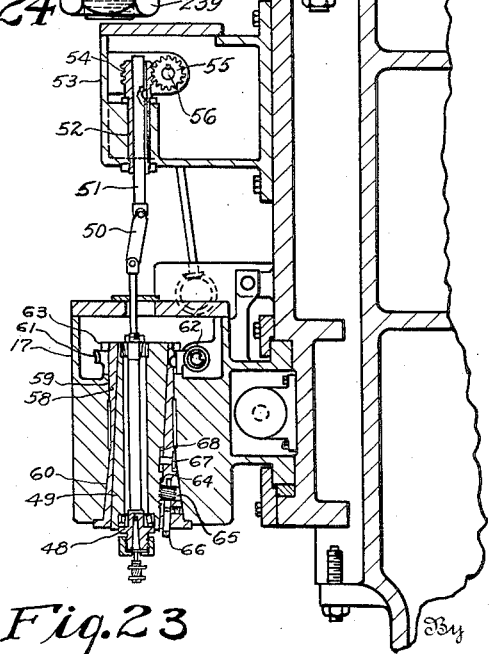
Fig. 23
Fig. 25
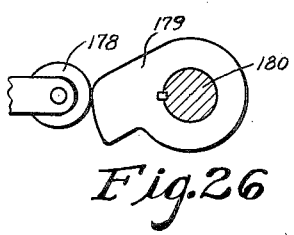
Fig. 26
Inventors
MILLARD ROMAINE
ERWIN G. ROEHM
H. K. Parsons
Attorney

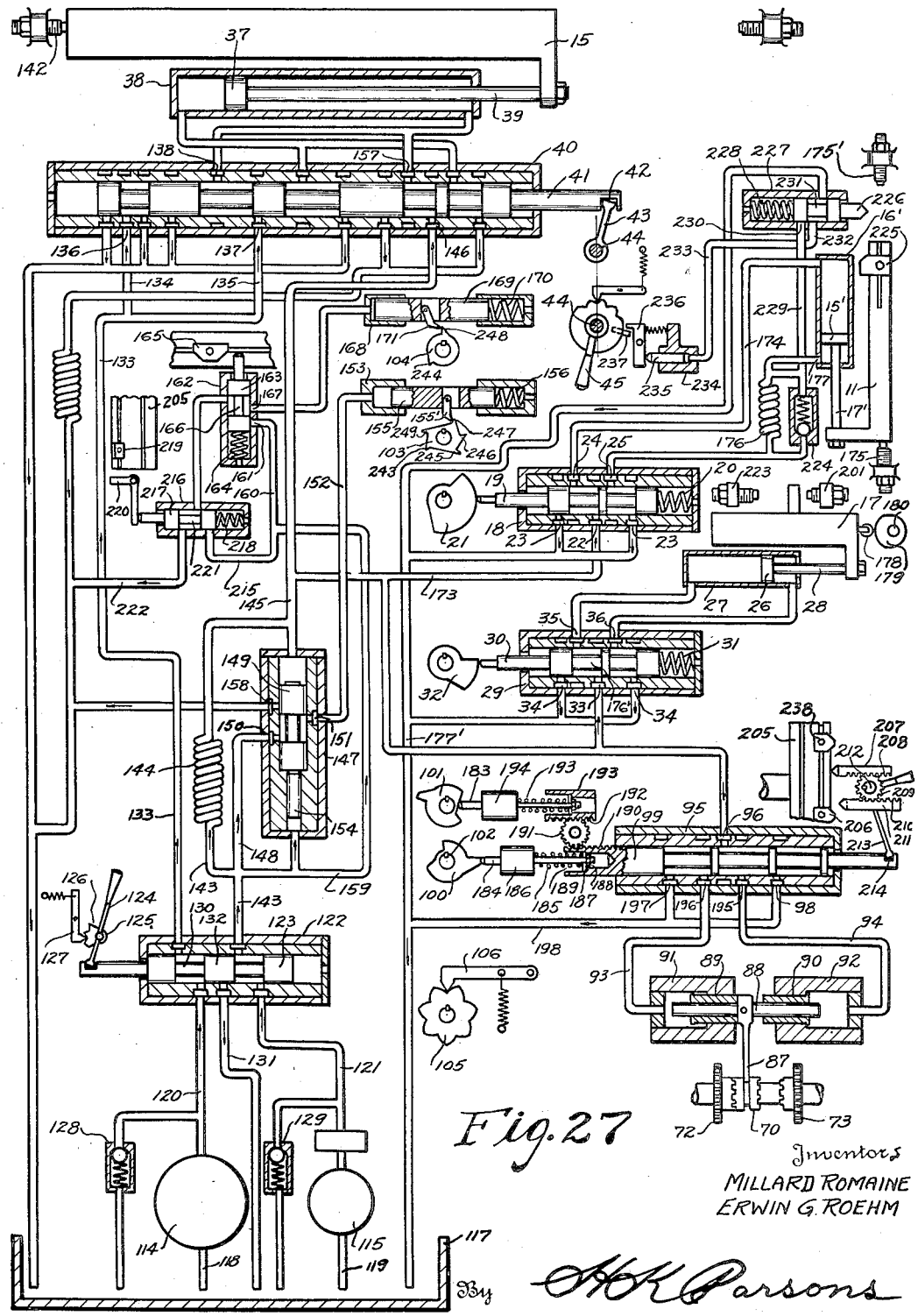

Patented Mar. 10, 1936

2,033,450

UNITED STATES PATENT OFFICE 2,033,450

PLANETARY MILLING MACHINE

Millard Romaine, Cincinnati, and Erwin G. Roehm, Norwood, Ohio, assignors to The Cincinnati Milling Machine Company, Cincinnati, Ohio, a corporation of Ohio Application October 26, 1933, Serial No. 695,340

20 Claims. (Cl. 90—15)

This invention relates to machine tools and more particularly to an improved automatic planetary milling machine.

One of the well-known conventional production methods of operating a milling machine is the reciprocating cycle, the chief merit of which is that it permits the operator to unload and load one or more work pieces while a similar group are being machined, thereby reducing the idle time of the machine and of the operator to a minimum.

One of the objects of this invention is to provide a machine which will make it possible to carry out planetary milling operations by the reciprocating cycle method so that while one group of work pieces are being machined, a second group may be unloaded and fresh work pieces substituted in their place.

Another object of this invention is to provide an improved control mechanism for coordinating the movements of a reciprocable work support with a planetary milling mechanism whereby all positioning and feeding movements may be performed automatically so that the operator may confine his attentions to loading and unloading the machine.

A further object of this invention is to provide an operating and control mechanism for the purposes aforesaid which is fluid operable whereby all positioning movements may be effected very quickly.

An additional object of this invention is the provision of means for adjusting the length of all positioning movements, as well as all operating movements, so that a large range of work sizes may be handled on the one machine.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 3 is a side elevation of the machine shown in Figure 1.

Figures 4 to 7 inclusive show the different positions of the table control lever.

Figures 8 to 11 inclusive show the different positions of the table control lever detent mechanism corresponding respectively to the positions of the lever shown in Figures 4 to 7 inclusive.

Figure 1:
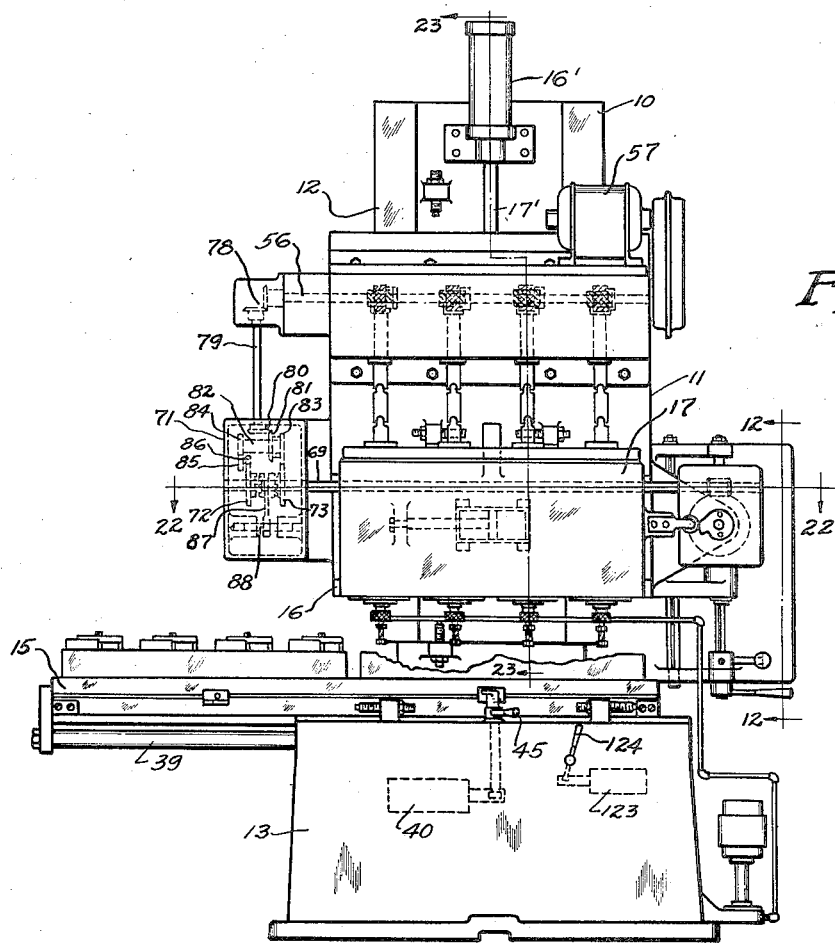
Figure 1 is a front elevation of a machine embodying the principles of this invention.
Figure 2:
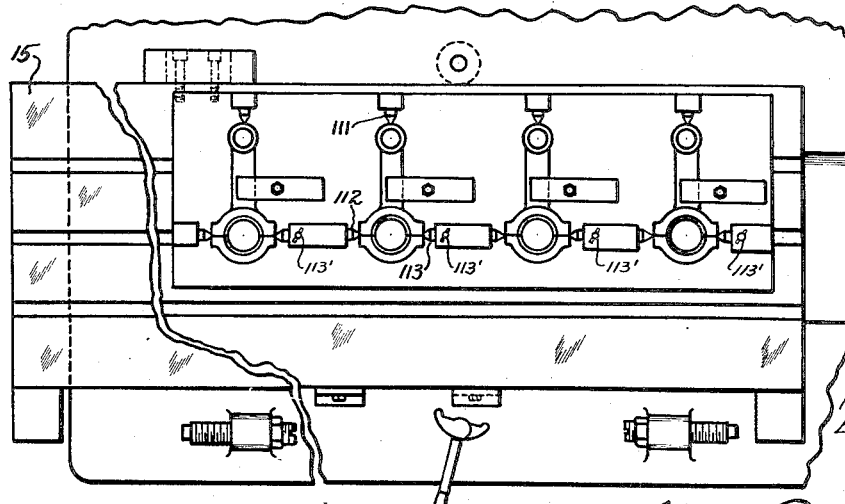
Figure 2 is a plan view of the work table and associated controls.
Figure 12:
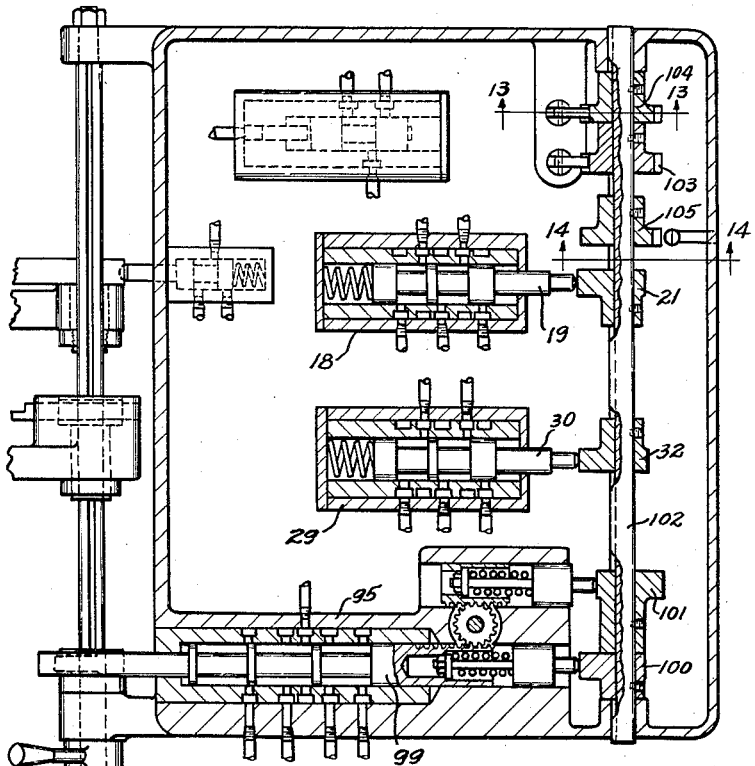

Figure 12 is a section through the control box as viewed on the line 12—12 of Figure 1.

Figure 13:
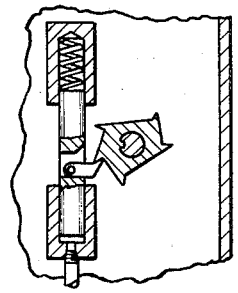

Figure 13 is a detailed sectional view of the ratchet plunger as viewed on the line 13—13 of Figure 12.

Figure 14:
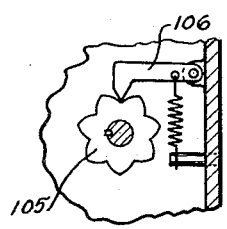

Figure 14 is a detailed sectional view of the cam shaft detent mechanism.

Figures 15 to 21 show the different positions of the cam shaft and the various cams attached thereto.

Figure 22 is a section on the line 22—22 of Figure 1 showing the drive mechanism to the planetary heads and the drum.

Figure 23 is a vertical section on the line 23—23 of Figure 1.

Figure 24 is a detailed view of a cutter assembly that may be used in this machine.

Figure 25 is a diagrammatic view of one cyclic path that may be carried out in this machine.

Figure 26 is a detailed view of the cam stop mechanism for the horizontal slide.

Figure 27 is a diagrammatic view of the hydraulic circuit of the machine.

One conventional embodiment of the machine is shown in Figures 1 and 3 and consists mainly of a column 10 having a slide 11 vertically movable upon guideways 12 formed upon the front face of the column, and a bed 13 having horizontal guideways 14 upon which is reciprocably mounted the work table 15. The vertical slide 11 has a pair of horizontal guideways 16 formed thereon for receiving the horizontal slide 17.

The vertical slide 11 is reciprocated by a piston 15' slidably mounted in a cylinder 16' carried by the upper part of the column 10. The piston is connected by suitable means, such as the piston rod 17' to the slide 11. As shown in Figure 27, fluid operation of the piston 15' is controlled by the valve 18 having a reciprocable valve plunger 19 which is held by a spring 20 against a control cam 21. This valve has a pressure port 22 and a pair of exhaust ports 23 which are selectively connected to ports 24 and 25 leading to opposite ends of the cylinder 16'.

Movement of the horizontal slide 17 is effected by a piston 26 reciprocably mounted in a cylinder 27 and connected by a piston rod 28 to the slide. Fluid operation of this piston is controlled by a separate valve 29 having a reciprocable valve plunger 30 which is held by a spring 31 against a control cam 32. This valve has a pressure port 33 and exhaust ports 34 which are selectively connectible by the plunger to ports 35 and 36 leading to opposite ends of the cylinder 27.

The table 15 is likewise reciprocated by a piston 37 reciprocably mounted in a cylinder 38 carried by the bed of the machine, the piston being connected by piston rod 39 in a suitable manner to the table 15. The flow of fluid to this cylinder is controlled by a valve 40 having a reciprocable valve plunger 41 which is notched at one end, as at 42, for receiving an operating lever 43 keyed to a vertical shaft 44. The upper end of this shaft carries the manually operable control lever 45 which, as shown in Figures 4 to 7, has two laterally extending lugs 46 and 47 for engagement by suitable dogs carried by the table for automatic positioning thereof.

The horizontal slide 17 carries a plurality of cutter spindles 48 which are anti-frictionally journaled in adjustable quills 49. The upper end of each spindle is connected by a universal coupling 50 to a vertical drive shaft 51 which has a splined connection in a sleeve 52 fixed against axial movement in a housing 53 secured to the vertical slide 12. Each sleeve carries a spiral gear 54 on the upper end, which meshes with a similar spiral gear 55 keyed to a horizontal drive shaft 56 extending beyond the housing 53 for coupling with a prime mover 57 mounted on the top of the housing. The connection between the prime mover and shaft 56 may be any conventional form of belt or chain drive. It will be noted that the housing 53 is fixed with the vertical slide, and that the horizontal slide 17 moves the cutter spindles with it and therefore the universal coupling 50 and spline shaft 51 are provided for maintaining a driving relation from the prime mover to the spindles in all horizontal positions of the slide 17.

In addition to being laterally movable upon bodily movement of the slide 17, the cutter spindles are also mounted for planetary movement relative to the slide 17 and regardless of whether the slide is moving or stationary. To this end the gear 49 which carries the cutter spindle is mounted in a sleeve 58, which has a straight bearing at 59 and a tapered bearing at 60 in the housing 17, and a worm gear 61 keyed to the upper end thereof meshing with a worm 62. A nut 63 is threaded to the upper end of the sleeve for drawing the sleeve upward into proper fit with the tapered bearing. It will be noted from Figure 24 that the axis of the quill 49 is not parallel to the axis of the sleeve 58 but is at an angle thereto while the axis of the contained spindle is parallel to the axis of the sleeve. The quill 49 is provided with the usual rack teeth 64 which mesh with a worm 65 fixed to the end of the adjusting shaft 66. Pin 67 engages a socket 68 formed in the periphery of the quill to prevent rotation thereof relative to the sleeve 58.

By rotating the shaft 66 the quill may be moved up or down relative to the sleeve and in so doing displaces the axis of the spindle laterally relative to the axis of the sleeve and thereby determines the eccentricity of the spindle so as to enlarge or decrease the diameter of the orbital path of the cutter upon rotation of the sleeve. The universal coupling 50 and spline shaft 51 also aid in this adjustment and maintain a permanent drive connection for rotation of the spindle. It will now be seen that by simultaneously rotating the spindle and the sleeve that a planetary milling operation may be performed.

The worm gears 62 that rotate the respective sleeves are keyed to a drive shaft 69 which is journaled in the housing 17 and the shaft extends beyond the housing into splined relation with a shiftable clutch member 70 carried by a bracket 71 secured in fixed relation to the vertical slide 12. A pair of gears 72 and 73 are mounted for free rotation on the shaft 69 but held in the housing against axial movement. The opposed faces of these gears have clutch teeth 74 and 75 respectively engageable with clutch teeth 76 and 77 formed on opposite sides respectively of the clutch member 70.

As shown in Figure 1, the gears 72 and 73 are driven from the spindle drive shaft 56 through a pair of bevel gears 78 and a vertical shaft 79 extending downward into the bracket 71. The lower end of this shaft has a bevel gear 80 meshing with bevel gear 81 fixed to a horizontal shaft 82. A spur gear 83 formed integral with the bevel gear 81 meshes directly with the gear 73 for effecting rotation thereof in one direction while a spur gear 84 on shaft 82 effects rotation of the gear 72 in the opposite direction by means of the intermediate idler gears 85 and 86. It will be noted that the gears 83 and 73 are substantially the same diameter so that the gear 73 will rotate at a fast rate, while the idler 86 is very much smaller than gear 72 whereby the latter will rotate at a slower or feed rate. Thus by shifting the clutch member 70 into mesh with the clutch teeth of gear 73 the shaft 69 will rotate at a fast rate in one direction and upon engagement of the clutch with gear 72 the shaft will be rotated at a feed rate in the opposite direction.

This clutch has a shifter fork 87 mounted on the reciprocable plunger 88 which is supported at opposite ends by shiftable sleeves 89 and 90 in cylinders 91 and 92. Upon admission of pressure to both cylinders the sleeves 89 and 90 will be moved toward one another and thereby centralize the clutch in a non-power-transmitting position; while upon admission of pressure to either one of the cylinders and connection of the other to exhaust, the clutch will be moved to its respective power transmitting positions. The cylinder 91 is connected by channel 93, and the cylinder 92 by the channel 94, to the control valve 95 which receives pressure through port 96 and has a pair of exhaust ports 97 and 98. A valve plunger 99 is reciprocably mounted in the cylinder and its position therein is controlled by a pair of cams 100 and 101 keyed to the vertical cam shaft 102 which also has the cams 21 and 32 keyed thereon, as well as the two ratchet wheels 103 and 104. The cam shaft 102 has seven different positions and a star wheel 105 is keyed to the shaft in cooperative relation to a spring pressed detent 106 to insure accurate positioning thereof.

One of the operations that may be carried out on this machine is the planetary milling of round holes of various sizes. For this purpose, a spiral mill, such as 107, as shown in Figure 24, is secured to the end of the spindle, which is shown in connection with a work piece 108, that may be, for example, a connecting rod for internal combustion engines. Since the side faces of the rod are usually finished square with the hole, a pair of face mills 109 and 110 also may be mounted on the spindle adjacent opposite ends of the mill 107 whereby all the surfaces may be finished simultaneously. The work pieces may be suitably mounted on the table as by a three-point support comprising a center 111 adapted to engage a center hole in the wrist pin of the connecting rod, and a pair of opposed centers 112 and 113 for engaging center holes in the opposite end of the connecting rod and preferably in the body portion thereof rather than in the cap portion thereof. The center 112 may be fixed and the other two centers movable to permit insertion of the work. These centers may be spring pressed in one direction to hold the work and provided with the usual manually operable locking screw 113'.

Provision has been made for axially positioning the cutter assembly shown in Figure 24 in order to accurately adjust the cutters 109 and 110 relative to the top and bottom faces of the work. This may be effected by threading a nut 239 in the end of the spindle shank 48' having an enlarged washer 240 mounted thereon for engaging cutter 109. The nut is rotated in the proper direction to raise or lower the cutter to desired position and then secured by a lock nut 241 and a washer 242 engaging the upper cutter 110. The washer 242 is keyed on the shank to prevent rotation during tightening of nut 241.

In general, the cycle of operation of the machine is as follows: The vertical slide is moved downward and the cutter assembly passes into the hole in the connecting rod 108 and in the relative axial position thereto as shown in Figure 24. The horizontal slide is then moved to cause engagement of the cutter with the work. The sleeve 58 is then rotated to effect the planetary milling operation after which the slide 17 is returned to withdraw the cutters from engagement with the work and position them somewhat centrally of the hole so that they may be withdrawn upon upward movement of the vertical slide 12 without interference from cutter 109. During this cutting operation the operator has been loading the fixture at the other end of the machine and upon final withdrawal of the cutters from the work the table 15 is reciprocated to position a new set of work pieces underneath the cutters for operation thereby, while the operator replaces the finished work with new unfinished work pieces.

The fluid pressure for reciprocating the table is supplied by a large volume low pressure pump 114 while the fluid pressure for operating the other devices is supplied by a high pressure low volume pump 115. These pumps are mounted in coaxial relation as shown in Figure 3 for rotation by a suitable prime mover, such as the electric motor 116. A fluid reservoir 117 is formed in the base of the column 10 and fluid is withdrawn therefrom by the pump 114 through the intake pipe 118 and by the pump 115 through the intake pipe 119. The delivery channel 120 of pump 114 and delivery channel 121 of the pump 115 are connected to a stop valve 122 having a reciprocable plunger 123 which is manually operable by the lever 124 mounted on the front of the machine as shown in Figure 1. This lever is pivotally mounted at 125 and has a detent plate 126 engageable by the spring pressed detent 127 for holding it in either one of its two operative positions. An emergency relief valve 128 is connected to the channel 120 of pump 114 and the operation of the machine is such that normally this valve does not open. The high pressure pump 115 is provided with a relief valve 129 connected to channel 121 and since this pump has a low volume, the relief valve may be more or less in continuous operation to insure maintenance of pressure desired. When the valve plunger 123 is shifted to the right from the position shown in Figure 27, the cannelure 130 in the valve plunger interconnects the delivery channel 120 of pump 114 with the return line 131 thereby short-circuiting the pump, but the piston portion 132 on the plunger blocks off the flow from pressure channel 121 so that the pump 115 has to relieve itself through valve 129.

In order to start the machine, the operator throws the control lever 124 to the position shown in Figure 1 and Figure 27, thereby connecting the pump 114 and its delivery channel 120 to the line 133 which divides into two branches 134 and 135 terminating in pressure ports 136 and 137 in the valve 40. If the work on the left hand end of the table has just been finished the operator moves the control lever 45 to the position shown in Figure 4 which thereby moves the valve plunger 41 to its extreme right position connecting the pressure port 137 to the port 138 thereby admitting fluid to the right hand end of cylinder 37 causing movement of the table 15 toward the left. This movement will continue until dog 139 carried by the table engages the wing 46 on handle 45 and rotates the same to the position shown in Figure 5. A detent plate 140 secured to the shaft 44 has a plurality of indents formed on the periphery thereof and engageable by the spring pressed detent 141 for holding the plunger 41 in any one of its four adjusted positions. Rotation of the shaft 44 by dog 139 will move the valve plunger 41 to the position shown in Figure 27.

While the valve 41 is in the first position described, the table will move toward the left at a rapid traverse rate and the trip actuation will occur just prior to the table reaching the positive stop 142. Also during this movement the fluid from pump 115 will be flowing through channel 121, valve 122, channel 143, hydraulic resistance 144, channel 145 to port 146 of valve 40. This port will be entirely closed off from the cylinder ports and therefore since no flow will be taking place in channel 145 the pressure in this channel will gradually build up until it is equal to the pressure in channel 143. An unloading valve 147 is connected by branch line 148 to the channel 143 and a reciprocable plunger 149 in the valve will be held in a position to connect port 150 which is the terminus of line 148, to port 151 which is connected by channel 152 to the ratchet operating cylinder 153. The upper end of the plunger 149 is larger in diameter than the lower end 154 and since the unit pressure of both ends of the plunger are the same, the larger area in the upper end will cause downward movement of the plunger to connect these ports. The fluid pressure will therefore flow through channel 152 and reciprocate the ratchet plunger 155 to the right against the resistance of spring 156 but since the space between teeth 243 and 245 of wheel 103 is positioned beneath the pawl 155' carried by the plunger, no indexing of shaft 102 will take place yet.

Fluid from line 143 will also be supplied to a branch line 159 during movement of the table just described, and this line has a fork 160 connected to port 161 of valve 162. A plunger 163 is reciprocably mounted in the valve and held in an upward position by spring 164 for engagement by a dog 165 carried on the rear side of the table. The dog is positioned on the table so as to depress the plunger 163 about midway of the table stroke. The cannelure 166 in the plunger will connect port 161 with port 167 thereby supplying fluid to the ratchet operating cylinder 168. A plunger 169 is reciprocably mounted in the cylinder and normally held to a left hand position by a spring 170. A pawl 171 pivotally mounted in the plunger engages the ratchet tooth 244 on the ratchet wheel 104 thereby rotating the cam shaft 102 from the position shown in Figure 15 to that shown in Figure 16. Since all the valves controlled by shaft 102 are now in neutral position, this indexing movement merely serves to pre-position the ratchet wheel 103 for subsequent operation by the unloading valve.

As soon as the plunger 41 is moved to the position shown in Figure 27, flow will occur in channel 145 through port 146 to port 157 and thereby to the right hand end of cylinder 38 and continue the movement of the table into engagement with the positive stop. This pressure will be maintained throughout the milling operation of the group of pieces on the right hand end of the table. When this flow starts to take place in channel 145, the pressure on the upper end of the unloading valve 147 will reduce to such an extent that the greater total pressure on the lower end of the cylinder will cause the valve plunger 149 to lift and connect port 151 to the exhaust port 158 thereby relieving the pressure in cylinder 153 and permitting the spring 156 to shift the plunger 155 to the right and thereby pick up the next tooth 245 on the ratchet wheel 103.

Figures 15, 16, 17, 18, 19, 20:
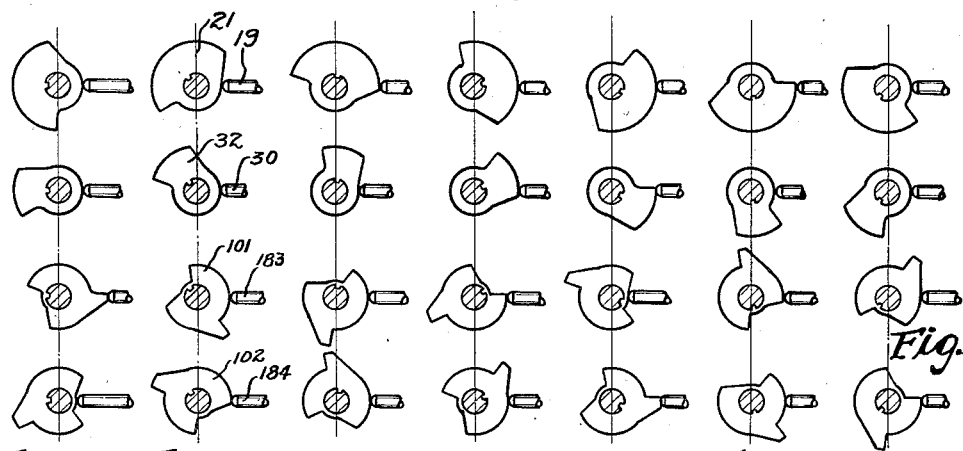

After the table hits the positive stop 142, pressure in line 145 will rise again, causing downward shift of the unloading valve plunger, and hydraulic actuation of ratchet plunger 155 which through engagement with tooth 245 will rotate the cam shaft 102 to the position shown in Figure 17. This connects the pressure in line 173 which is a branch of the high pressure channel 145 through port 22 and port 24 and channel 174 to the upper end of cylinder 16'. This will cause the vertical slide to be moved downward to the fixed stop 175 which may be adjusted to determine the length of downward movement. The speed of this movement is controlled by the hydraulic resistance 176 which connects the port 177 in the lower end of cylinder 16 to the selected port 25, this port now being connected to the exhaust port 23. Since flow has been taking place in channel 145, the pressure therein has dropped and the unloading valve plunger 149 has moved downward to permit return of the plunger 155. As the vertical slide engages the positive stop, the pressure in line 174 and thereby motor channel 145 will build up and cause the unloading valve plunger to be moved downward, thereby connecting the pressure line 148 to the supply line 52 and cause a second indexing of the cam shaft 102 by pawl 155' engaging tooth 246 to the position shown in Figure 18 which corresponds to the position of the parts shown in Figure 27. By a comparison of Figures 17 and 18 it will be seen that the only change effected is in plunger 30 of valve 29 which controls the reciprocation of the horizontal slide. This plunger will be moved to the position shown in Figure 27 by the cam 32 against the resistance of spring 41. A cannelure 176' will connect port 33 to port 35 of the valve thereby causing another flow to take place in channel 145 and cause a drop in pressure therein, and thereby an upward shift of plunger 149 to disconnect pressure from cylinder 153 and connect the same to the exhaust line 158. The fluid in the right hand end of cylinder 27 will return through ports 36 and 34 to the reservoir through the main return line 177'. This will cause movement of the slide 17 toward the right until a roller 178 Figures 22 and 26 fixed to the end of the slide engages a cam 179 fixed to a drum shaft 180.

A worm wheel 181 is carried by this shaft and meshes with a worm 182 keyed to the end of the drive shaft 69 whereby upon rotation of this shaft the cam 179 will be rotated in a counterclockwise direction as viewed in Figure 26.

When the slide engages the cam, the flow to cylinder 27 will naturally stop again increasing the pressure in the supply line 145 to cause downward movement of the unloading valve, and another operation of the ratchet plunger 155, pawl 155' engaging tooth 247 this time which will thereby rotate the cam shaft 102 to the position shown in Figure 19. By a comparison between Figures 18 and 19 it will be seen that the plungers 19 and 30 still keep their same position, but that the pair of plungers 183 and 184, which control the movement of valve plunger 99, have been moved, the plunger 184 moving toward the right and the plunger 183 being moved toward the left. A spring 185 is interposed between an enlarged portion 186 of plunger 184 and a washer 187 slidably mounted on the end of the plunger and kept from coming off by a nut 188. The washer 187 fits in a counterbore 189 formed in the end of the plunger 99. Rack teeth 190 are formed in the plunger 99 and engage an intermediate pinion 191 which engages with rack teeth 192 formed on a reciprocable member 193 which has an interposed spring connection 193', with an enlargement 194 on plunger 183 similar to the one just described. It will now be seen that as the plunger 184 moves toward the right as viewed in Figure 27 that if the plunger 99 does not move immediately, that the spring 185 may be slightly compressed. As the plunger 99 moves, it will rotate the pinion 191 and cause outward movement of plunger 183 into engagement with the cam 101 and thereby tend to limit the movement of valve 99. This will position the valve plunger 99 in the position shown in Figure 27 whereby fluid pressure will again flow from channel 145 through port 96 of valve 95 to the port 195, channel 94 and cylinder 92 to shift the clutch 87 to a feed position. The return flow from cylinder 91 will pass through channel 93, ports 196 and 197, to the return branch line 198. Clutch 70 will now engage the feed gear 72 and effect rotation of the spindle supporting sleeves 58 as well as the worm 182 which thereby will cause rotation of cam 179.

The following movement which takes place will be best understood by reference to Figure 25 wherein the lateral movement of the spindles by the slide 17 is represented by the distance between the points 199 and 200. As the cam 179 rotates, it permits the slide 17 to gradually continue its movement toward the right until it abuts the positive stop 201. Simultaneous with this movement, the sleeves 59 are rotating so that the resultant of these two movements will be a spiral curve which is represented in Figure 25 by the curve 202. After the horizontal slide engages the positive stop the sleeve 58 will continue its rotation and describe a circular path 203. This movement will continue for a complete revolution plus a slight overlap which is represented at 204 in Figure 25. During this rotation the worm 182 has been rotating the shaft 180 and moving the cam 179 entirely out of engagement with the roller 178 and also has been rotating a dog plate 205 keyed to the end of shaft 180 adjacent the column side of the machine.

Since the worm and worm gear constitute a reduction mechanism, the shaft 180 will not of course effect a complete revolution. A dog 238 is mounted thereon for engaging a trip plunger 207 which is reciprocably mounted in a fixed part of the column. This plunger has rack teeth 208 engaging a pinion 209, the pinion also engaging rack teeth 210 in a reciprocable plunger 211 mounted on the side opposite to the plunger 207. When the valve plunger 99 is shifted toward the right as shown in Figure 27, the plunger 207 will extend toward the dog wheel further than the retracted plunger 211. The dog 238 is of a length which, upon engagement with the plunger 207, will move it back and move the plunger 211 forward until they are even with one another. A shaft 212 which supports the pinion 210 has an arm 213 integral therewith for engaging a slot 214 formed in the end of the valve plunger 99. This partial movement of the plunger 207 will move the valve 99 through the arm 213 to a central or neutral position thereby causing fluid pressure to flow in both channels 93 and 94 and thus through the sleeves 89 and 90 move the clutch 70 to a neutral position.

Since the fluid that will be displaced from the cylinder 92 will mostly flow around into the cylinder 91, there will be very little actual flow in line 145 and at least not enough to depend upon for operation of the unloading valve. Therefore to insure that the unloading valve is operated at this time, a fork 215 of line 159 is connected to a by-pass valve 216 which has a reciprocable plunger 217 normally held in a left hand position by a spring 218. Another dog 219 is carried by the dog wheel 205 for engaging a bell crank 220, one arm of which engages the end of plunger 217. The dog 219 is adapted to engage the bell crank at substantially the same time the plunger 207 is operated by dog 238 so that a cannelure 221 in the plunger will connect the fork 215 to the ratchet cylinder 168 through valve 216 and valve 162. Pawl 171 will engage tooth 248 to rotate cam shaft 102.

This operation of the ratchet will shift the cam shaft 102 to the position shown in Figure 20. This will reposition the cams 100 and 101 so that the plungers 183 and 184 will take up a position corresponding to the position of the plungers 207 and 211. This is possible because upon movement of the plunger 99 to its neutral position by the dog 238, the spring 185 was compressed while the member 193 was moved toward the right away from the washer on the end of plunger 183. Rotation of the cam shaft to this position also caused the plunger 30 to be advanced by the spring 31 so as to connect the pressure port 33 with port 36 and cause movement of the connected slide toward the left. This movement will continue until the slide hits the positive stop 223. Engagement with the positive stop will cause another operation of the unloading valve and another indexing of the cam shaft 102 through pawl 155' engaging tooth 249 to the position shown in Figure 21. The only change caused by this is that the plunger 19 is advanced by its spring 20 to connect the pressure port 22 of the valve to the port 25 whereby fluid will now flow to the lower end of cylinder 16, but this time through the check valve 224 so as to by-pass the hydraulic resistance 176.

The vertical slide 11 will now move upward to withdraw the cutters from the work. When the vertical slide hits the positive stop 175', the pressure will rise again in supply line 145 causing another indexing of the cam shaft 102 through ratchet 155' engaging tooth 243 to the position shown in Figure 15. By a comparison of this figure with Figure 21 it will be seen that only two plungers are moved from their previous position, the plunger 183 being moved toward the right and the plunger 184 being moved toward the left.

This will cause the valve 99 to move toward the left and connect the pressure port 96 to the port 196 and cause shifting of the clutch 70 into its rapid traverse reverse position. Also this movement of plunger 99 will operate through arm 213 to cause movement of plunger 211 toward the dog wheel and retraction of plunger 207 away from the dog wheel. Rapid rotation of shaft 69 in an opposite direction will now take place, thereby returning the axis of the cutter to the position 199 as shown in Figure 25. This will also cause rotation of the dog wheel 205 in an opposite direction to cause engagement of a dog 206 with plunger 211 thereby shifting the valve 99 again to a central position and causing movement of clutch 70 to its neutral position, thereby stopping rotation of the parts. During upward movement of the vertical slide a dog 225 carried thereby will depress plunger 226 of valve 227, the plunger being held in a dog engaging position by a spring 228. A branch line 229 supplies pressure to port 230 of this valve which is connected by cannelure 231 upon shifting of the plunger 226 to port 232 thereby supplying pressure through line 233 to the interlock cylinder 234. This cylinder has a plunger 235 which acts on the end of an interlock lever 236 to withdraw the lever from the path of a pin 237 carried by the detent plate 140 thereby permitting the operator, after the vertical slide has been withdrawn, to throw lever 45 from the position shown in Figure 9 to the position shown in Figure 10 to cause rapid traverse movement of the slide toward the right.

What is claimed is:

1. In a machine tool having a plurality of fluid operable slides severally movable in predetermined succession for positioning a tool in contact with a work piece, the combination of means for effecting the several movements in a predetermined sequence including a source of fluid pressure, a common delivery line therefrom having individual branch lines extending to the various slides, a control valve in each branch line, means for shifting one of said valves and thereby coupling the common supply line to one slide, and a fluid operable mechanism responsive to stoppage of flow in the common supply line for shifting the next control valve to cause sequential movement of another slide.

2. In a machine tool having a plurality of fluid operable slides severally movable in predetermined succession for positioning a tool in contact with a work piece, the combination of means for effecting said movements including a source of fluid pressure, a common delivery line therefrom having individual branch lines extending to the various slides, a control valve in each branch line, means operable on one valve for coupling the common supply line to one slide, a fluid operable mechanism responsive to stoppage of flow in the common supply line for shifting the next control valve to cause movement of a second slide, said mechanism including a plurality of cams individually connected to the various control valves, and a common fluid operated plunger effective on said cams each time that a stoppage of flow occurs in the common supply line.

3. In a machine tool having a plurality of fluid operable slides severally movable in a predetermined sequence for positioning a tool in contact with the work, the combination of means for effecting said movement including a source of fluid pressure, a common delivery line therefrom having individual branch lines extending to the various slides, a control valve in each branch line, means operable on one valve for coupling the common supply line to one slide and initiating the sequence of movements and additional means comprising a fluid operable mechanism responsive to stoppage of flow in the common supply line for shifting the remaining control valves to initiate movement of the remaining slides, said mechanism including a plurality of cams operatively connected to the valves, a common shaft for supporting said cams, and a fluid operated ratchet mechanism for indexing said shaft each time a stoppage of flow occurs in the common supply line.

4. In a machine tool having a plurality of fluid operable slides individually movable in predetermined succession for positioning a tool in contact with the work, the combination of control means therefor including a source of fluid pressure, a common delivery line therefrom having individual branch lines extending to the various slides, a control valve in each branch line, means operable on one valve for coupling the common supply line to one slide, a fluid operable mechanism responsive to stoppage of flow in the common supply line for shifting the control valve of the next slide to cause movement thereof, said mechanism including a plurality of cams individual to the respective slides, a common shaft for supporting said cams, a fluid operated ratchet mechanism for indexing said shaft each time a stoppage of flow occurs in the common supply line, and detent mechanism operative upon the common shaft for maintaining the same in its various indexed positions.

5. In a machine tool having a first fluid operable slide and a plurality of other fluid operable slides, the combination of means for severally effecting movement of each slide in a predetermined sequence, including a source of pressure, a common supply line therefrom, means for connecting said line to cause movement of one slide, a fluid operable device responsive to stoppage of flow in the supply line as individual slides come to rest to initiate movement of the next slide, and a stop valve interposed between the source of pressure and the common supply line for stopping at will all of said slides.

6. In a machine tool having a first fluid operable slide and a plurality of other fluid operable slides, the combination of means for effecting movement of each slide individually including a first supply line, a rapid traverse pump for delivering fluid thereto, a valve positionable for coupling said line to a first slide, a feed pump, means trip operable in response to rapid traverse movement of the slide for automatically shifting said valve to couple the feed pump with the slide, an unloading valve between the feed pump and first mentioned valve, and means responsive to no flow for operatively connecting the feed pump to one of the remaining slides for effecting movement thereof.

7. In a machine tool having a first fluid operable slide and a plurality of other fluid operable slides, the combination of means for effecting several movements of the slides in a predetermined sequence including a first supply line, a rapid traverse pump for delivering fluid thereto, a valve positionable for coupling said line to the first slide, a feed pump, means trip operable in response to rapid traverse movement of the slide for shifting said valve to couple the feed pump with the slide, an unloading valve between the feed pump and first mentioned valve, means responsive to stoppage of flow due to stoppage of the slide for operatively connecting the feed pump to one of the remaining slides for effecting movement thereof, said flow responsive means also being operative upon stoppage of the second named slide for initiating movement of a third slide.

8. In a machine tool having a work support and a rotary tool head, a plurality of slides successively movable to effect relative positioning between the tool head and work support preparatory to a tooling operation, fluid operable means for moving the slides severally and in predetermined succession to effect said relative positioning, means for rotating said tool head, and fluid operable means responsive to stoppage of the last positioning slide to initiate said rotary movement of the tool head.

9. In a machine tool having a work support and a rotary tool head, a plurality of slides successively movable to effect relative positioning between the tool head and work support to effect engagement between tool and work, fluid operable means for moving the slides in predetermined succession to effect said relative positioning, means for rotating said head to effect a planetary tooling operation, fluid operable means responsive to stoppage of the last positioning slide to initiate said rotary movement, and means simultaneously movable with the head for automatically stopping its rotation.

10. In a machine tool having a work support and a rotary tool head, a plurality of slides successively movable to effect relative positioning between the tool head and work support to effect engagement between tool and work, fluid operable means for moving the slides in predetermined succession to effect said relative positioning, means for rotating said head to effect a planetary tooling operation, fluid operable means responsive to stoppage of the last positioning slide to initiate said rotary movement, means simultaneously movable with the head for automatically stopping its rotation, and additional trip operable means for initiating return movement of the slides but in inverse order.

11. In a machine tool having a work support and a rotary tool head, a plurality of slides successively movable to effect relative positioning between the tool head and work support to effect engagement between tool and work, fluid operable means for advancing the several slides in predetermined succession to effect said relative positioning, means for rotating said head to effect a planetary tooling operation, fluid operable means responsive to stoppage of the last positioning slide to initiate said rotary movement, means movable with the head for automatically stopping its rotation, additional trip operable means for initiating return movement of the slides in inverse order, said means including a dog wheel, a control valve, a source of fluid pressure and a fluid operated ratchet mechanism adapted to be connected to said pressure by the control valve upon trip operation thereof.

12. In a machine tool having a work support and a rotary tool head, a plurality of slides successively movable to effect relative positioning between the tool head and work support to effect engagement between tool and work, fluid operable means for moving the slides in predetermined succession to effect said relative positioning, means for rotating said head to effect a planetary tooling operation, fluid operable means responsive to stoppage of the last positioning slide to initiate said rotary movement, said fluid operable means including a ratchet mechanism, a control clutch having a central inoperative position and an operating position on either side thereof, a piston and cylinder mechanism connected for shifting said clutch, a source of pressure, a control valve, and cam means operable by said ratchet for shifting the valve to an operating position for effecting said rotation.

13. In a planetary milling machine having a work support and a planetary milling head, the combination of three slides, each individually movable and in predetermined succession to relatively position the work support and the tool head preparatory to a tooling operation, a transmission including a control clutch for effecting rotation of the head, a plurality of trip operable means simultaneously effective to stop rotation of the head and cause return movement in inverse order of all of said slides except the last one, manually operable means for controlling the movement of the last slide, and trip operable means actuated by movement of the last slide for causing return rotation of the planetary head.

14. In a planetary milling machine having a work support and a planetary milling head, the combination of three slides, each individually movable and in predetermined succession to position the work support and the tool head preparatory to a tooling operation, a transmission including a control clutch for effecting rotation of the head, a plurality of trip operable means simultaneously effective to stop rotation of the head and cause return movement in inverse order of all of said slides except the last one, manualy operable means for controlling the movement of the last slide, trip operable means actuated by movement of the last slide for causing return rotation of the planetary head, and an hydraulic interlock between the last two slides to prevent operation of said manual control until the next to the last slide has completed its movement.

15. In a planetary milling machine having a work support and a rotary tool head, the combination of four shiftable elements for relatively positioning the work support and tool head, and for causing planetary movement of the tool head, means for successively moving said elements including a source of fluid pressure, individual reverse valves for each element, a common unloading valve between the source of pressure, and said individual valves, a positive stop for limiting the movement of the first three successively movable elements and thereby cause successive operation of the unloading valve, means controlled by said valve for initiating movement of the next shiftable element, and trip means responsive to movement of the last element for stopping the same.

16. In a machine tool having a plurality of fluid operable members for effecting positioning and feeding movements between a tool support and a work support, the combination of a plurality of fluid control valves individual to the respective members, and means for actuating said valves in a predetermined sequence comprising a cam shaft operatively connected with all of said valves and indexable to successive stations, a pair of fluid operable ratchet mechanisms operatively connected to the shaft, a source of fluid pressure, individual control valves for coupling the source to the respective mechanisms, and independent means for operating each control valve whereby the shaft may be indexed from different moving parts on the machine.

17. In a machine tool having a plurality of fluid operable members and control valves individual to the respective members for determining advance, retraction or stoppage of the respective members, the combination of indexable means operatively connected for shifting said valves to different positions and in a predetermined sequence including a fluid operated ratchet, a supply line, a pair of main control valves, a return line serially connected through said main valves, a pressure port in each valve connected to the supply line, and independent trip operable means connected to the respective main valves whereby the ratchet may be actuated from different stations of the machine.

18. In a machine tool having an indexable controlled member movable to a plurality of stations for causing different combinations of movements of the shiftable members of the machine, the combination of means for automatically effecting said indexing including a first ratchet mechanism operatively connected for indexing said member from certain of said stations to the next station, a second ratchet mechanism for moving the member from additional stations to the next station, fluid operated means for actuating each ratchet mechanism, trip operable means for controlling the operation of one of said ratchet mechanisms, and pressure differential controlled means for determining operation of the other mechanism.

19. A planetary milling machine having a support, a reciprocable work slide carried by the support, a plurality of equally spaced tool heads carried by the support, means to secure a first group of work pieces on the slide in the same spaced relation as the tool heads, said tool heads comprising eccentrically mounted cutter spindles, cutters secured to the end of said spindles, power operable means to move the cutters into engagement with the work to cause the cutters to execute a planetary orbit while in engagement with the work and to withdraw the cutters from the work, and means responsive to completion of the withdrawal movement to shift the work slide to a new position and thereby present a new group of work pieces to the respective tool heads.

20. A planetary milling machine having a work slide, a tool slide, means to secure two groups of work pieces on the work slide, a plurality of planetary milling heads equally spaced on the tool slide, each head comprising an eccentric spindle having cutting means secured to the end thereof, means to move the tool slide and thereby the cutters into engagement with one group of work pieces, means automatically effective upon engagement of the cutting means with the work to move said spindles in a planetary orbit, means automatically effective for retracting the cutting means upon completion of the orbital movement, and means for shifting said slide to present a second group of work pieces to the cutters.

MILLARD ROMAINE.
ERWIN G. ROEHM.